G. E. COOK.
GEAR SHIFTING DEVICE.
APPLICATION FILED JULY 28, 1917.

1,277,867.

Patented Sept. 3, 1918.
4 SHEETS—SHEET 1.

WITNESSES

INVENTOR
G. E. Cook
BY
ATTORNEYS

G. E. COOK.
GEAR SHIFTING DEVICE.
APPLICATION FILED JULY 28, 1917.
1,277,867.
Patented Sept. 3, 1918.
4 SHEETS—SHEET 2.
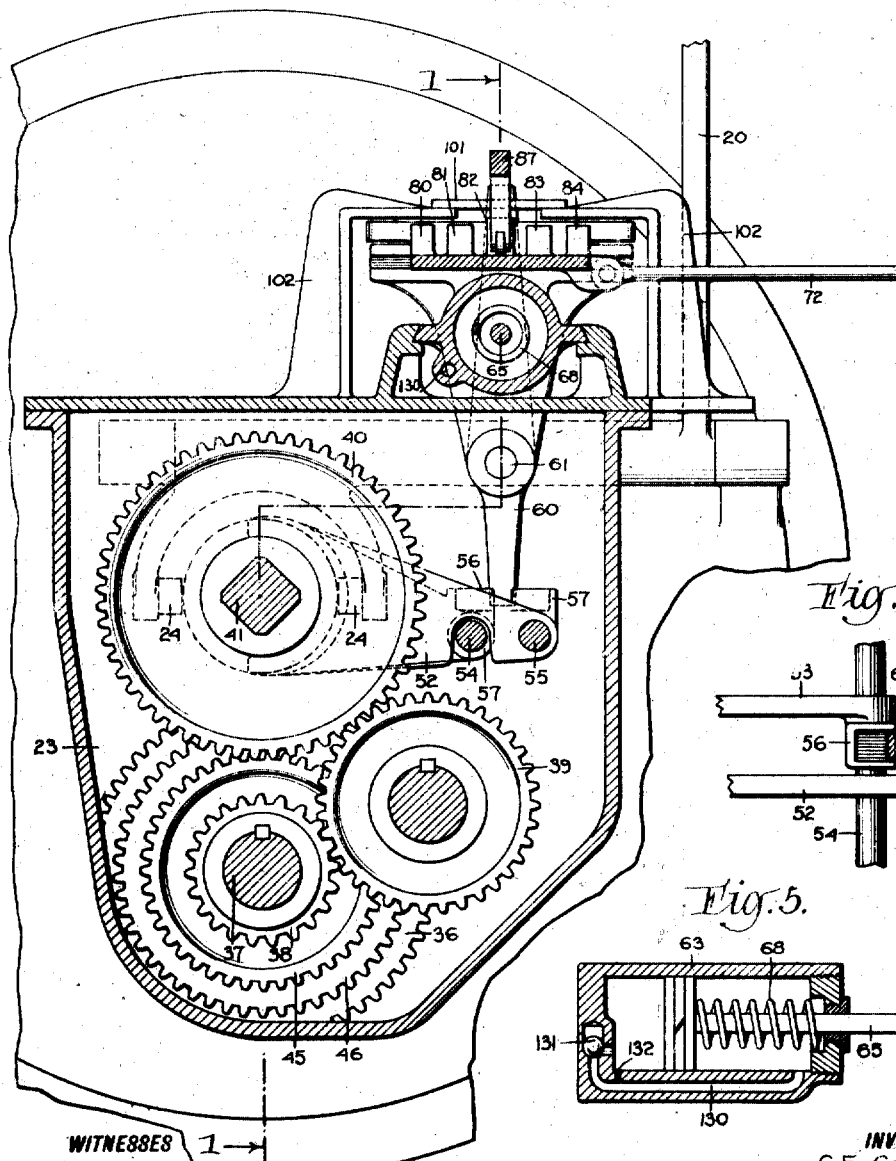
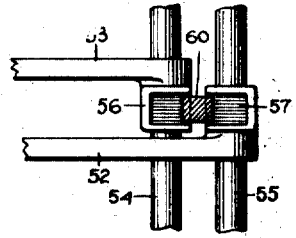
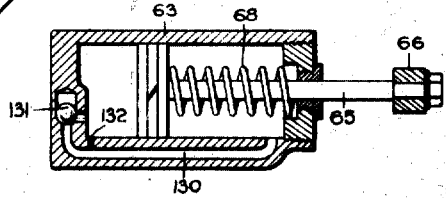
INVENTOR
G. E. Cook
BY
ATTORN

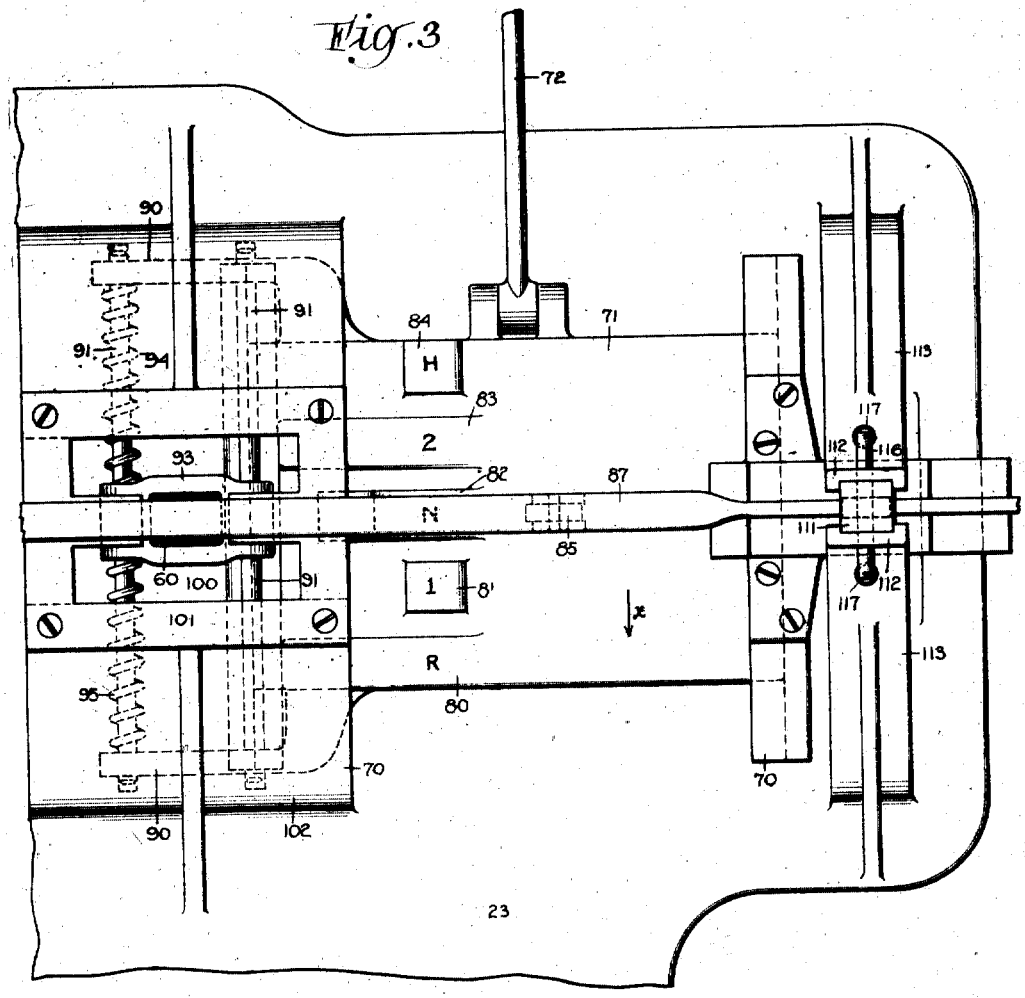
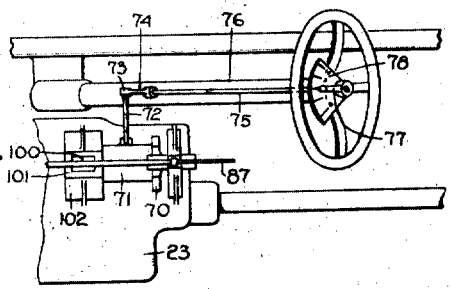

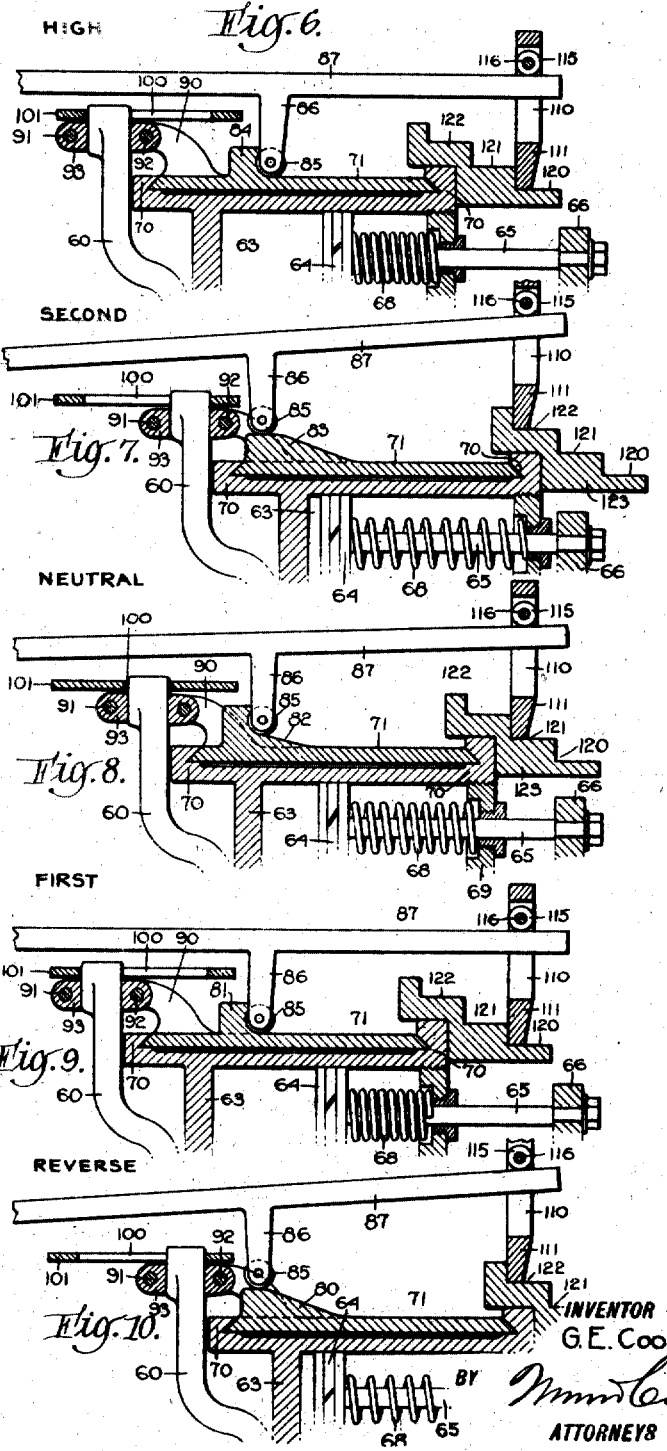

UNITED STATES PATENT OFFICE.

GEORGE ELWOOD COOK, OF BROOKLYN, NEW YORK.

GEAR-SHIFTING DEVICE.

1,277,867.  Specification of Letters Patent.  Patented Sept. 3, 1918.

Application filed July 28, 1917. Serial No. 183,352.

*To all whom it may concern:*

Be it known that I, GEORGE ELWOOD COOK, a citizen of the United States, and a resident of the city of New York, borough of Brooklyn, in the county of Kings and State of New York, have invented a new and Improved Gear-Shifting Device, of which the following is a full, clear, and exact description.

The invention relates to automobile gear sets of the selective type, and its object is to provide a new and improved gear shifting device more especially designed for use in the power transmission of automobiles, auto-trucks and other power driven vehicles, and arranged to enable the driver to readily change the speed or reverse selectively as needed at the time and without first shifting to any other speed.

In order to accomplish the desired result use is made of a change speed gear set provided with a shifting member, manually controlled means connected with the said shifting member to move the latter into selective position, a clutch pedal, and a connection connecting the clutch pedal with the said shifting member to move the latter from selective into actuating position.

A practical embodiment of the invention is represented in the accompanying drawings forming a part of this specification, in which similar characters of reference indicate corresponding parts in all the views.

Fig. 2 is a transverse section of the same on the line 2—2 of Fig. 1;

Fig. 3 is an enlarged plan view of the same;

Fig. 4 is a reduced plan view of the same as applied and showing the manually controlled selective means attached to the steering wheel of the vehicle;

Fig. 5 is a sectional plan view of the spring pressed cylinder mounted to slide on a fixed piston;

Fig. 6 is a fragmentary sectional side elevation of the gear shifting device with the parts in high speed position;

Fig. 7 is a similar view of the same with the parts in second speed position;

Fig. 8 is a similar view of the same with the parts in neutral position;

Fig. 9 is a similar view of the same with the parts in first speed position;

Fig. 10 is a similar view of the same with the parts in reversing position;

Figs. 6a, 7a, 8a, 9a and 10a are sectional plan views of the shifting member in various positions in the H-plate, the figures being supplementary to Figs. 6, 7, 8, 9 and 10, respectively;

Fig. 11 is a sectional plan view of the shifting device, the section being on the line 11—11 of Fig. 2.

Figure 1:
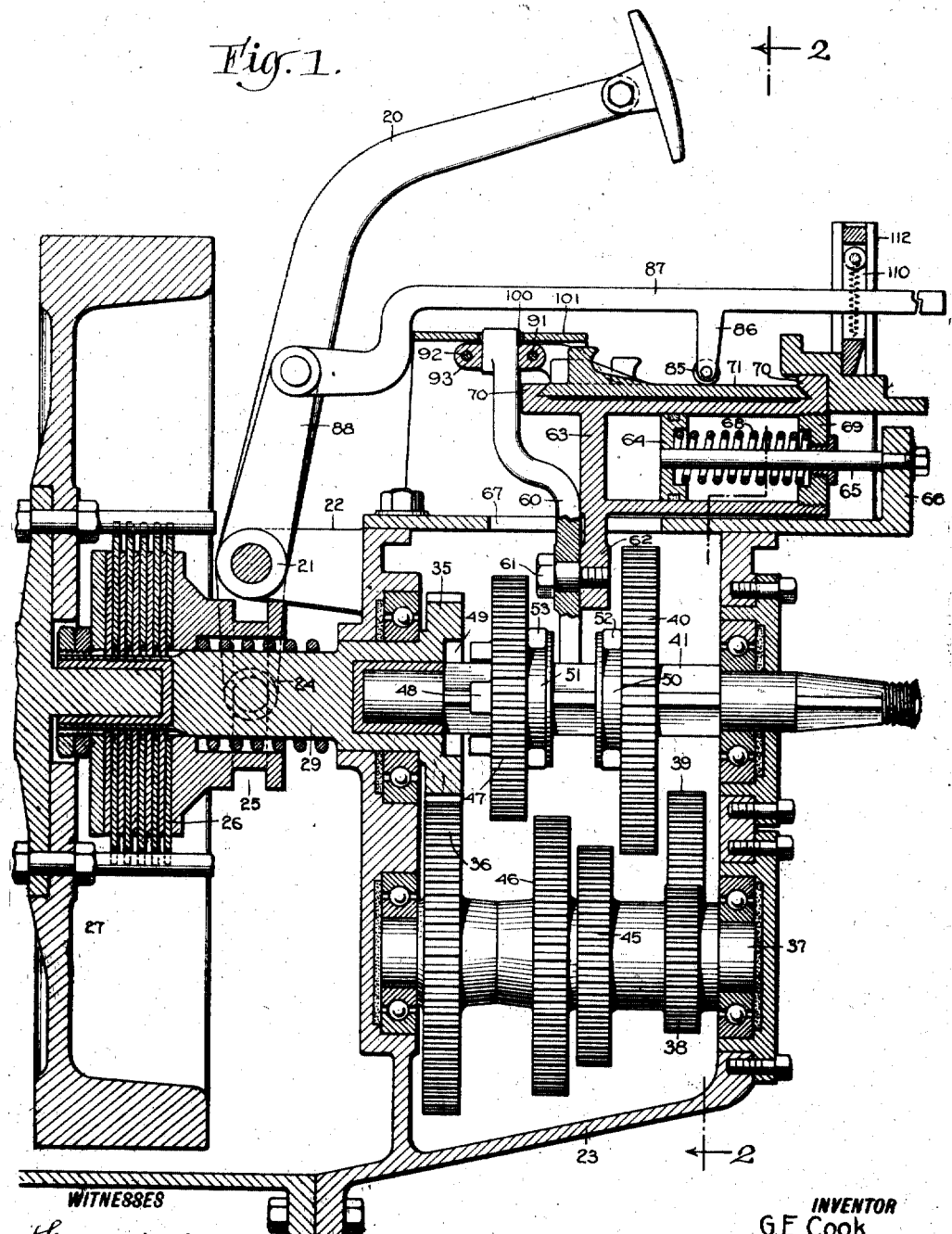
Figure 1 is a sectional side elevation of the gear shifting device on the line 1—1 of Fig. 2.

The pedal 20 of the clutch operating device is fulcrumed on a shaft 21 journaled in brackets 22 attached to or forming part of the forward end of the box 23 of the change speed gear set. On the shaft 21 is secured a shifting fork 24 engaging a shifting collar 25 on the movable clutch member 26 of a clutch 27 adapted to connect the engine or crank shaft 28 with the transmission shaft 29 in the usual manner. The transmission shaft 29 extends into the box 23 and on the end of the transmission shaft 29 is secured a drive gear wheel 35 in mesh with the countershaft drive gear wheel 36 secured on the countershaft 37 journaled in the box 23. On the countershaft 37 is secured a pinion 38 in mesh with an intermediate pinion 39 journaled in the box 23 and adapted to be engaged by a gear wheel 40 mounted to turn with and to slide lengthwise on the drive shaft 41 journaled in the box 23 and in the hub of the drive gear wheel 35, as plainly shown in Fig. 1. The drive shaft 41 is connected with the axle or other part to be driven. The gear wheel 40 is also adapted to engage a gear wheel 45 secured on the countershaft 37 on which is also secured a gear wheel 46 intermediate the gear wheels 36 and 45. The gear wheel 46 is adapted to be engaged by a gear wheel 47 mounted to turn with and to slide lengthwise on the drive shaft 41, and the said gear wheel 47 is provided with a clutch member 48 adapted to engage a clutch member 49 arranged on the drive gear wheel 35 secured to the transmission shaft 29, as previously explained. The gear wheels 40 and 47 are provided at their opposite faces with shifting collars 50 and 51 engaged by shifting forks 52, 53 mounted to slide on guide rods 54, 55 attached to the box 23 (see Fig. 11). The shifting forks 52, 53 are provided with notched lugs 56, 57, either one of which is adapted to be engaged by the lower end of a shifting lever 60 fulcrumed on a stud 61 attached to a bracket 62 depending from a cylinder 63 mounted to slide longitudinally on a piston 64 having its fixed piston rod 65 attached to a bracket 66 extending from the top of the box 23. The lever 60 and the bracket 62 extend through a slot 67 formed in the top of the box 23. A spring 68 is interposed between the piston 64 and the rear head 69 of the cylinder 63 with a view to move the cylinder 63 in a rearward direction, as hereinafter more fully explained.

The top of the cylinder 63 is provided with transverse guideways 70 in which is mounted to slide a cam plate 71 pivotally connected at one side with a link 72 connected by a ball and socket joint 73 with an arm 74 secured on a shaft 75 mounted in the steering column 76 and terminating in a pointer handle 77 indicating on a dial 78, as plainly shown in Fig. 4. The dial 78 is provided with a graduation indicating "reverse," "first" speed, "neutral," "second" speed and "high" speed. Thus the driver imparting a swinging motion to the handle 77 turns the shaft 75 more or less to shift the cam plate 71 correspondingly in a transverse direction according to what selective position is desired at the time and indicated by the handle 77 on the graduation of the dial 78. As shown in Fig. 4, the pointer handle 77 is in neutral position. The top of the cam plate 71 is provided with cams 80, 81, 82, 83 and 84, preferably marked with indicating characters corresponding to those on the dial 78. The cams 80, 81, 82, 83 and 84 are spaced apart in a transverse direction, and on shifting the plate 71 transversely any one of the said cams can be moved into the path of a friction roller 85 journaled in a depending arm 86 on a bar 87 pivotally connected at its forward end with an arm 88 secured on the pedal shaft 21.

The cam 80 (see Fig. 10) is in the form of an incline for the friction roller 85 to travel up and down. The cam 81 (see Fig. 9) is in the form of a recessed lug adapted to be engaged by the friction roller 85 to move the plate 71 and with it the cylinder 63 in a forward direction, as hereinafter more fully explained. The cam 82 (see Fig. 8) is in the combined form of an incline and recessed lug for the friction roller 85 to travel up the incline and engage the recess with a view to move the plate 71 and the cylinder 63 forward. The cam 83 is in the form of an incline for the friction roller 85 to travel up and down. The cam 84 is similar to the cam 81, that is, is in the form of a recessed lug for engagement by the friction roller 85.

The forward end of the cam plate 71 is provided with brackets 90 supporting two transversely extending guide rods 91 and 92 on which is mounted to slide in a transverse direction a yoke 93 engaging the upper rectangular end of the shifting lever 60. The guide rod 91 is provided on opposite sides of the yoke 93 with springs 94, 95 to normally hold the yoke 93 in central position, as plainly indicated in Fig. 3. When the cam plate 71 is shifted from its neutral position shown in Fig. 3 in the transverse direction of the arrow $x$ a swinging movement is given to the lever 60 in one direction, and when the cam plate 71 is moved from neutral position in the inverse direction of the arrow $x$ then a swinging movement is given to the lever 60 in the opposite direction. On shifting the cam plate 71 in either of the directions mentioned, the corresponding cams 83, 84 and 81, 80 are moved into the path of the friction roller 85 on the bar 87. The extreme upper portion of the lever 60 extends into the opening 100 of an H-plate 101 attached to a bracket 102 rising from the box 23 of the change speed gear set. It is understood that the upper end of the shifting lever 60 is guided to the proper positions in the opening 100 of the H-plate 101 to insure proper meshing of the speed changing gear wheels 40, 47 with the gear wheels 39, 45 and 46 and the clutch members 48, 49. It is understood that the transverse swinging movement of the shifting lever 60 is limited by the side walls of the opening 100 in the H-plate 101 during the transverse shifting of the cam slide 71 in either direction of the arrow $x$, and the corresponding spring 94 or 95 is compressed during the further movement of the slide 71 into selective position.

The rear portion of the bar 87 extends through an opening 110 in a vertically disposed catch 111 mounted to slide up and down in suitable guideways 112 arranged on brackets 113 rising from the box 23 of the change speed gear set. Within the opening 110 is arranged a friction roller 115 journaled on a transverse rod 116 attached to the catch 111 and projecting beyond the sides thereof, as plainly shown in Fig. 3. The outer ends of the rod 116 are connected with springs 117 fastened at their lower ends to the bracket 113 to exert a downward pressure on the catch 111. The bottom of the catch 111 is adapted to engage any one of three steps or shoulders 120, 121 and 122 of a step plate 123 secured to the head 69 of the cylinder 63 to lock the cylinder in any one of its adjusted positions. The rear portion of the rod 87 is adapted to engage the under side of the friction roller 115 to lift the catch 111 with a view to disengage the same from any one of the steps 120, 121 or 122, as hereinafter more fully explained.

The forward movement of the cylinder 63 is controlled by the driver pressing the pedal 20 in a forward direction, and the return movement of the cylinder 63 is governed by its spring 68, and in order to check the action of the spring 68 use is made of a retarding means such, for instance, as shown in Fig. 5. The cylinder 63 is filled with glycerin, oil or other suitable liquid, and a by-pass 130 is formed in the cylinder to connect the opposite ends with each other. The by-pass 130 is provided with a valve 131 adapted to open during the forward movement of the cylinder 63 to allow the liquid to flow unobstructedly from the rear end of the cylinder into the front end thereof, but when the cylinder 63 moves rearwardly the valve 131 closes the by-pass 130 at the forward end and the liquid in the forward end of the cylinder 63 now passes by way of a cleat hole 132 into the by-pass and by way of the latter to the rear end of the cylinder 63. As the flow of the liquid during the return movement of the cylinder 63 is comparatively slow, it is evident that the action of the spring 68 is checked and with it the return movement of the cylinder 63.

The operation is as follows:

When the several parts are in the neutral position shown in Figs. 1, 2, 3, 4, 8 and 8ª, then the lever 60 is in midway position in the opening 100 of the H-plate 101, the friction roller 85 is in engagement with the cam 82, and the catch 111 is in engagement with the step 121 and hence the cylinder 63 is held against either forward or backward movement, with the gears of the gear set in the neutral position shown in Fig. 4 and the lower end of the lever 60 midway between the notched lugs 56 and 57, as shown in Fig. 11. When the driver desires to throw in the change speed gear, say into first speed, he turns the handle 77 to the mark 1 on the dial 78 whereby the cam slide 71 is shifted in the inverse direction of the arrow x until the cam 81 is in the path of the friction roller 85. During this movement of the cam slide 71 the latter imparts a swinging motion to the shifting lever 60 whereby the upper end thereof moves into the middle of the right hand leg of the H-plate 101 and the lower end of the lever 60 moves into engagement with the notched lug 56. The driver now presses the pedal 20 forward whereby a forward movement is given to the bar 87 and the friction roller 85 thereof now moves into engagement with the cam 81 and moves the same forward and with it the cam slide 71 and the cylinder 63, which latter carries the lever 60 bodily along and in doing so the lever 60 moves the shifting fork 52 with it thus causing the gear wheel 40 to slide forward and into mesh with the first speed gear wheel 45. The operator now releases the pedal 20 to throw in the clutch 27 with a view to rotate the transmission shaft, the countershaft, and the gear wheels 38, 45 and 46 mounted thereon. The rotary motion of the gear wheel 45 is now transmitted to the gear wheel 40 and by the latter to the drive shaft 41 to rotate the latter at first speed. During the forward movement of the cylinder 63 the locking catch 111 drops from the step 121 into the step 120 by the action of its springs 117 thus locking the cylinder in forward position and thereby holding the parts in first speed position. During the release of the pedal 20 the bar 87 returns to its normal position and its friction roller 85 moves rearwardly out of engagement with the cam 81.

When it is desired to change from first speed to say second speed, the driver turns the handle 77 from the "1" mark to the "2" mark on the dial 78 whereby the cam slide 71 is moved in the direction of the arrow x until the cam 83 is in the path of the friction roller 85. The driver next presses the pedal 20 forward whereby the clutch 27 is thrown out and the rotary motion of the transmission shaft 29 and the countershaft 37 ceases. During the forward movement of the pedal the bar 87 is moved forward and its friction roller 85 now travels up the cam 83 thus imparting an upward swinging motion to the bar 87 whereby the catch 111 is raised out of engagement with the step 120 to allow the cylinder 63 to slide slowly rearward by the action of its spring 68 and retarded by the slow movement of the liquid flowing from the front end of the cylinder 63 to the rear end thereof. During this rearward movement of the cylinder 63 the shifting lever 60, the shifting fork 52 and the gear wheel 40 are carried along whereby the gear wheel 40 moves out of mesh with the gear wheel 45. When the upper end of the shifting lever 60 reaches a middle position in the right hand leg of the H-plate 101 the previously compressed spring 94 imparts a sliding motion to the yoke 93 in the direction of the arrow x whereby a swinging motion is given to the lever 60 to move the lower end thereof out of the notched lug 56 of the fork 52 and into the notched lug 57 of the fork 53, and as the cylinder 63 is during this time still moving rearwardly the shifting lever 60 is carried along and with it the fork 53 and the gear wheel 47. The latter now moves into engagement with the second speed gear wheel 46. The driver now releases the pedal 20 to throw the clutch into active position with a view to rotate the transmission shaft 29, the countershaft 37 and the gear wheels 38, 45 and 46 mounted thereon. The rotary motion of the second gear wheel 46 is now transmitted to the gear wheel 47 and the drive shaft 41 to rotate the latter at second speed. The return movement of the cylinder 63 is limited by the catch 111 engaging the step 122, it being understood that the catch 111 was lifted sufficiently high by the bar 87 to clear the step 121 by the action of the cam 83 on the bar 87, as shown in Fig. 13.

7. During the release of the pedal 20 the bar 87 returns to normal position with the friction roller 85 out of engagement with the cam 83.

When it is desired to change second speed to say high speed, the driver first turns the handle 77 to the mark H on the dial 78 whereby the cam slide 71 is caused to travel in the direction of the arrow $x$ until the cam 84 is in the path of the friction roller 85 and the spring 95 is placed under tension. The driver now presses the pedal 20 in a forward direction to stop the countershaft 37 and to cause the friction roller 85 to engage the cam 84 and pull the cam slide 71, the cylinder 63 and the shifting lever 60, the shifting fork 53 and the gear wheel 47 forward whereby the latter moves out of mesh with the gear wheel 46, and its clutch member 47 moves into engagement with the clutch member 49 of the drive gear wheel 35. During the forward movement of the cylinder 63 the spring 68 is placed under tension and the catch 111 snaps first into the step 121 and then into the step 120 to lock the cylinder 63 against rearward movement.

When it is desired to change from high speed to say second speed or first speed or to neutral position, it is only necessary for the driver to first swing the handle 77 to the corresponding mark 2, 1 or N on the dial 78 to correspondingly shift the cam slide 71, and then the driver presses the pedal 20 with the result above explained, after which the pedal is again released.

When it is desired to change from neutral, first, second or high to reverse position the driver turns the handle 77 to the mark R on the dial 78 whereby the cam slide 71 is shifted in the inverse direction of the arrow $x$ until the cam 80 is in the path of the friction roller 85. The driver now presses the pedal 20 forward whereby the bar 87 is moved forward and its friction roller travels up the incline cam 80 to swing the bar 87 upward and thus unlock the cylinder 63 by lifting the catch out of the step 120 or 121 it may be in at the time, or, if in the step 122, to remain there. The shifting of the cam slide 71 causes a transverse swinging of the lever 60 to engage the latter with the notch 56 and during the rearward movement of the cylinder 63 the lever 60, the shifting fork 52 and the gear wheel 40 are carried along to move the gear wheel 40 into mesh with the intermediate gear wheel 39. The pedal 20 is next released to rotate the countershaft which by the gear wheel 38, the intermediate gear wheel 39 and the gear wheel 40 rotates the drive shaft in the reverse direction to that of the transverse shaft. When the pedal 20 is next released the bar 87 returns to normal position.

From the foregoing it will be seen that the driver in order to change from neutral to any speed or to reversing position, or from any speed to neutral or reversing position, it is only necessary for the driver to move the handle 77 to the corresponding mark on the dial 78, then press the pedal 20 and finally release the same. As the handle 77 is preferably located at the steering wheel it is within easy reach of one hand of the driver.

It will be noticed that by the arrangement described, use is made of a manually controlled selecting mechanism and a clutch pedal controlled actuating mechanism, of which the selecting mechanism is set into a desired selected position by the driver manipulating the handle 77 correspondingly, and the said actuating mechanism coacts with the said selecting mechanism to change the gear set according to the selected position.

When changing the gear set to first speed or high speed, the pressing of the clutch pedal 20 moves the cylinder 63 of the actuating mechanism forward by the pressure applied by the foot of the driver on the said pedal (see Figs. 6 and 9), and in changing the gear set to second or reverse the cylinder 63 of the actuating mechanism is moved rearward by the pressure of its spring 68 after the cylinder is released by the catch 111 on the driver pressing the clutch pedal 20 forward.

It will also be noticed that the driver can press the clutch pedal 20 forward to disconnect the motor shaft from the transmission shaft no matter in what position the gear set is in at the time and without affecting the position of the gear set.

Having thus described my invention, I claim as new and desire to secure by Letters Patent:—

1. In a gear speed changing device for automobiles and other vehicles, the combination of a gear set having a shifting member, a clutch pedal, a selecting mechanism having a manually controlled setting member for setting the selecting mechanism into a selected position, the setting mechanism setting said shifting member in selected position, and an actuating mechanism controlled by the clutch pedal and coacting with the said selecting mechanism to move the said shifting member from selected position into actuating position.

2. In a gear speed changing device for automobiles and other vehicles, the combination of a gear set having a shifting member, a clutch pedal, a selecting mechanism having a manually controlled setting member for setting the selecting mechanism into a selected position, the selecting mechanism setting the shifting member in selected position, an actuating mechanism controlled by the clutch pedal and coacting with the said selecting mechanism to move the said shifting member from selected position into actuating position, and a locking device controlled by the said actuating mechanism to lock the shifting member in the adjusted position.

3. In a gear speed changing device for automobiles and other vehicles, the combination of a gear set having a shifting member, a clutch pedal, a selecting mechanism having a manually controlled member for setting the selecting mechanism into a desired selected position, the selecting mechanism setting said shifting member into selected position, an actuating mechanism controlled by the clutch pedal and coacting with the said selecting mechanism to move the shifting member from the selected position into actuating position on pressing the clutch pedal, and means controlled by the actuating mechanism for locking the selecting mechanism in position.

4. In a gear speed changing device for automobiles and other vehicles, the combination of a gear set having a shifting member, a clutch pedal, a selecting mechanism having a manually controlled member for setting the selecting mechanism into a desired selected position, the selecting mechanism setting said shifting member into selected position, and an actuating mechanism controlled by the clutch pedal and coacting with the said selecting mechanism to move the shifting member from the selected position into actuating position on pressing the clutch pedal and to release the said selecting mechanism on the release of the clutch pedal to allow resetting of the selecting mechanism independent of the actuating mechanism.

5. In a gear speed changing device for automobiles and other vehicles, the combination of a gear set having a shifting member, a clutch pedal, a selecting mechanism having a manually controlled member for setting the selecting mechanism into a desired selected position, the selecting mechanism setting said shifting member into selected position, an actuating mechanism controlled by the clutch pedal and coacting with the said selecting mechanism to move the shifting member from the selected position into actuating position on pressing the clutch pedal, a locking device controlled by the said actuating mechanism to lock the latter in the adjusted position, the said selecting mechanism on release of the clutch pedal being released from the actuating mechanism to allow resetting of the selecting mechanism independent of the actuating mechanism.

6. In combination, a gear set, a selecting mechanism having a manually controlled member for setting the selecting mechanism into a desired selected position, a pedal controlled actuating mechanism coacting with the said selecting mechanism to change the gear set according to the selected position, and a locking device controlled by the said actuating mechanism to lock the latter in the selected position, the said actuating device on release of its pedal releasing the said selecting mechanism to allow resetting of the latter independent of the actuating mechanism.

7. In combination, an automobile gear set, a selecting mechanism having a manually controlled member arranged at the steering wheel of the automobile for setting the selecting mechanism into a desired selected position, a clutch pedal controlled actuating mechanism coacting with the said selecting mechanism to change the gear set according to the selected position, and a locking device controlled by the said actuating mechanism to lock the selecting mechanism in the selected position, the said actuating device on release of its pedal releasing the said selecting mechanism to allow resetting of the latter independent of the actuating mechanism.

8. In a gear shifting device for automobiles and like vehicles, the combination of a change speed gear set having a shifting member, a spring actuated sliding member on which the said shifting member is mounted to rock in a direction at an angle to the plane in which swings the said shiftable member, a locking device for the said sliding member, a manually controlled setting device connected with the shifting member to move the latter into selective position, and a clutch pedal controlled mechanism connected with the said sliding member and with the said locking device to unlock the latter and to move the sliding member in one direction against the tension of its spring and to allow the sliding member to move in the opposite direction by its spring on being released by the locking device.

9. In a gear shifting device for automobiles and like vehicles, the combination of a change speed gear set having a shiftable member, a pedal clutch operating device having a pedal mounted to rock, a spring pressed slidable member connected with and moved in one direction by the said pedal and in the opposite direction by its spring, the said shiftable member being mounted to rock on the said slidable member to move into selective position relative to the gear set, and a manually controlled setting device movable on the said slidable member and engaging the said shifting member to rock the latter, and locking means locking the said slidable member in an adjusted position.

10. In a gear shifting device for automobiles and like vehicles, the combination of a change speed gear set having a shifting member adapted to rock into selective position and to move bodily into shifting position in a direction at a right angle to the plane in which rocks the shifting member, a slidable member on which rocks the shifting member, manually controlled setting means for rocking the said shifting member, and a clutch pedal connected with the slidable member for imparting a bodily movement to the said slidable member and the shifting member.

11. In a gear shifting device for automobiles and like vehicles, the combination of a change speed gear set having a shifting member adapted to rock into selective position and to move bodily into shifting position in a plane in which rocks the shifting member, a slidable member on which rocks the shifting member, manually controlled setting means for rocking the said shifting member, a clutch pedal connected with the slidable member for imparting a bodily movement to the said slidable member and the shifting member, and a locking device controlled by the clutch pedal and locking the shiftable member in the adjusted position.

12. In a gear shifting device for automobiles and like vehicles, the combination of a change speed gear set having a shifting member adapted to rock into selective position and to move bodily into shifting position in a plane in which rocks the shifting member, a slidable member on which rocks the shifting member, manually controlled setting means for rocking the said shifting member, a clutch pedal connected with the slidable member for imparting a bodily movement to the said slidable member and the shifting member, a locking device controlled by the clutch pedal and locking the shiftable member in the adjusted position, and retarding means connected with the said sliding member to retard the return movement thereof.

13. In a gear shifting device for automobiles and like vehicles, the combination of a change speed gear set having a rocking shifting member, adapted to rock in a transverse direction into selective position, a spring actuated slidable member mounted to slide longitudinally in one direction by its spring and on which the said shifting member is fulcrumed, a manually controlled slide mounted to slide transversely on the said slidable member and provided with cams, a bar mounted to slide lengthwise and adapted to engage any one of the said cams on shifting the said slide transversely, a clutch pedal connected with the said slide, and a locking device for the said slidable member and controlled by the said bar.

14. In a gear shifting device for automobiles and like vehicles, the combination of a change speed gear set having a rocking shifting member adapted to rock in a transverse direction into selective position, a spring actuated slidable member mounted to slide longitudinally in one direction by its spring and on which the said shifting member is fulcrumed, a manually controlled slide mounted to slide transversely on the said slidable member and provided with cams, a bar mounted to slide lengthwise thereon and adapted to engage any one of the said cams on shifting the said slide transversely, a clutch pedal connected with the said slide, a locking device for the said slidable member and controlled by the said bar, and a fixed retaining and guiding plate for the said shifting member to guide the latter and hold the same in an adjusted position.

15. In a gear shifting device for automobiles and like vehicles, the combination of a change speed gear set provided with a rocking shifting member, a cylinder on one end of which the said shifting member is fulcrumed, a fixed piston on which the said cylinder is mounted to slide forward and backward, a spring interposed between the said cylinder and piston, a manually controlled slide mounted to slide transversely on the said cylinder and engaging the said shifting member to rock the latter into selective position, the slide being provided with cams spaced in transverse relation, and the slide engaging the said shifting member to rock the latter in a transverse direction, a bar mounted to move lengthwise and up and down, the bar having a member adapted to engage any one of the said cams, and a clutch pedal connected with the said bar.

16. In a gear shifting device for automobiles and like vehicles, the combination of a change speed gear set provided with a rocking shifting member, a cylinder on one end of which the said shifting member is fulcrumed, a fixed piston on which the said cylinder is mounted to slide forward and backward, a spring interposed between the said cylinder and piston, a manually controlled slide mounted to slide transversely on the said cylinder and engaging the said shifting member to rock the latter into selective position, the slide being provided with cams spaced in transverse relation, and the slide engaging the said shifting member to rock the latter in a transverse direction, a bar mounted to move lengthwise and up and down, the bar having a member adapted to engage any one of the said cams, a clutch pedal connected with the said bar, stepped shoulders on the rear end of the said cylinder, and a locking catch adapted to engage the said shoulders and controlled by the said bar.

17. In a gear shifting device for automobiles and like vehicles, the combination of a change speed gear set provided with a rocking shifting member, a cylinder on one end of which the said shifting member is fulcrumed, a fixed piston on which the said cylinder is mounted to slide forward and backward, a spring interposed between the said cylinder and piston, a manually controlled slide mounted to slide transversely on the said cylinder and engaging the said shifting member to rock the latter into selective position, the slide being provided with cams spaced in transverse relation and the slide engaging the said shifting member to rock the latter in a transverse direction, a bar mounted to move lengthwise and up and down, the bar having a member adapted to engage any one of the said cams, a clutch pedal connected with the said bar, stepped shoulders on the rear end of the said cylinder, a spring pressed locking catch adapted to engage any one of the said shoulders and forming a guide for the said bar, and a vertical guideway in which the said locking catch is mounted to slide up and down.

18. In a gear shifting device for automobiles and like vehicles, the combination of a change speed gear-set provided with a rocking shifting member, a cylinder to which the shifting member is pivoted, a fixed piston on which the cylinder slides, a spring interposed between the piston and one end of the spring, means for retarding the action of the spring, a manually controlled member mounted to slide transversely on the cylinder and engaging the said shifting member to operate it, the slide being provided with cams, a movable bar having a member engaging the said cams, and means for operating the bar.

19. In a gear shifting device for automobiles of a change speed gear-set provided with a rocking shifting member, a cylinder to one end of which the shifting member is pivoted, said cylinder being adapted to contain a liquid and provided with a valved controlled by-pass and a cleat opening, a fixed piston on which the cylinder slides, a spring between the piston and one end of the cylinder, a member mounted to slide transversely on the cylinder and provided with cams, the said member being operatively connected with the shifting member, a sliding bar provided with a member engaging the said cams, and means for operating the said bar.

GEORGE ELWOOD COOK.